US005827603A

United States Patent [19]

Süss

[11] Patent Number: 5,827,603

[45] Date of Patent: Oct. 27, 1998

[54] TRANSFER FOIL

[75] Inventor: Joachim Süss, Fürth, Germany

[73] Assignee: Leonhard Kurz GmbH & Co., Furth, Germany

[21] Appl. No.: 793,997

[22] PCT Filed: Aug. 31, 1995

[86] PCT No.: PCT/DE95/01194

§ 371 Date: Mar. 17, 1997

§ 102(e) Date: Mar. 17, 1997

[87] PCT Pub. No.: WO96/09174

PCT Pub. Date: Mar. 28, 1996

[30] Foreign Application Priority Data

Sep. 22, 1994 [DE] Germany .......................... 44 33 858.9

[51] Int. Cl.[6] ........................................................ B32B 3/10

[52] U.S. Cl. ........................ 428/195; 428/337; 428/411.1; 428/480; 428/500; 428/913; 428/914; 428/915

[58] Field of Search ................................ 428/195, 411.1, 428/913, 914, 488.4, 500, 480, 915, 337; 156/212

[56] References Cited

U.S. PATENT DOCUMENTS

| | | | |
|---|---|---|---|
| 3,961,121 | 6/1976 | Warsager | 428/200 |
| 4,215,170 | 7/1980 | Vilaprinyo Oliva | 428/328 |
| 4,415,623 | 11/1983 | Schlaepfer | 428/200 |
| 4,477,312 | 10/1984 | Czichy | 156/656 |
| 5,342,672 | 8/1994 | Killey | 428/195 |

*Primary Examiner*—Marie Yamnitzky
*Attorney, Agent, or Firm*—Louis E. Marn

[57] ABSTRACT

A transfer foil which makes it possible, starting from one foil, both to transfer hot stamping decorative elements on to a substrate and also individually to identify the substrate by a thermotransfer printing procedure, for which purpose the transfer foil includes on the one hand decorative layer arrangements known from hot stamping foils and on the other hand a thermotransfer layer, which are arranged in separate areas on the carrier film.

8 Claims, 1 Drawing Sheet

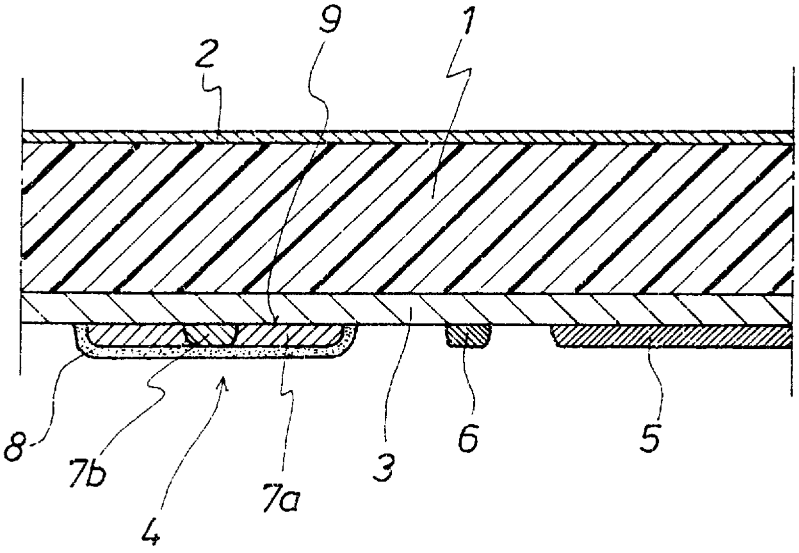
2
9
1
8
7b
4
7a
3
6
5

TRANSFER FOIL

BACKGROUND OF THE INVENTION

The invention concerns a transfer foil comprising a carrier film and at least one colour layer which is detachable from the carrier film in a region-wise manner by means of heat and/or pressure and which is transferable on to a substrate.

DESCRIPTION OF THE PRIOR ART

So-called hot stamping foils are used to a very great extent for the decoration of substrate surfaces. Such foils include a carrier film on which there is provided a decorative layer arrangement which, by means of heat and/or pressure, is detachable from the carrier film and can be transferred on to the substrate. The decorative layer arrangement of the hot stamping foils usually comprises a plurality of comparatively stable lacquer layers and is fixed to the substrate by means of a special adhesive layer. In that connection the lacquer layers are applied to the carrier film in a printing procedure. In that way it is possible to produce suitable decorations which then appear on the substrate which is decorated with the hot stamping foil.

For the purposes of transfering the decorative layer arrangements of hot stamping foils, operation must be conducted with a sufficiently high pressure and adequate temperature in order to ensure clean detachment of the regions of the decorative layer arrangement which are to be transferred, on to the substrate, because the decorative layer arrangement enjoys comparatively high stability. That means that comparatively stable tools must be employed. It is not possible to deal with hot stamping foils in the manner known for example from thermal printers because the print heads of thermal printers do not reach the temperatures and pressures required for the transfer of the decorative layer arrangement from hot stamping foils on to the substrate.

It is also already known for suitable substrates, primarily paper, to be decorated and in particular to be written upon, by thermotransfer printing. In this case also a suitable thermotransfer layer is transferred on the substrate from a carrier film. In that case the known thermotransfer layers permit operation with comparatively short temperature pulses and a low pressure, which makes it possible to construct suitable print heads with a fine degree of resolution, which heads can also be continuously varied in regard to the arrangement of the various dots, for example to produce figures and letters.

Hot stamping foils are increasingly used in recent times for applying security features to a wide range of different substrates. It is known for example for fine structures which have an optical-diffraction effect to be formed in the decorative layer arrangement of a hot stamping foil and for them to be transferred by a hot stamping process on to a substrate, for example a value-bearing paper or bond, a credit card, a pass or identity card or the like. In those areas of use there is sometimes a wish to provide the value-bearing document not only with the security feature which is the same for the entire series of value-bearing documents. Over and above that, individualisation of the value-bearing document is wanted in a large number of cases, for example by stating the name of the holder of a pass or identity card, by applying a reference number etc, in which case the individualising addition (name, reference number etc) is to be easy to alter from one document to another, but a change in the sense of forgery thereof is to be substantially prevented after it has been applied to the document.

It would now be possible, for that purpose, in a first working operation, to provide the value-bearing document with a security feature by means of a conventional hot stamping foil and then, in a second working operation, to effect individualisation by applying a word, a combination of figures or the like, by a thermotransfer printing process. That procedure however suffers in particular from the disadvantage that comparatively complicated machines are required, which transport the value-bearing document to be safeguarded or identified from a first station in which the security feature is applied by means of a hot stamping foil, into a second station in which the thermotransfer printing operation is conducted. In that respect there is in particular also the problem of satisfactorily aligning the value-bearing document in the hot stamping step and the thermotransfer printing step so that the various security features do not involve any undesirable displacement which could possibly have the result that security features are in mutually superimposed relationship, in an undesirable fashion, thereby giving rise to wastage.

OBJECTS OF THE INVENTION

The object of the present invention is now to propose a possible way of reducing the machine expenditure if a value-bearing document is to be provided on the one hand by means of a hot stamping foil with a decorative element, for example a security feature, and on the other hand by means of thermotransfer printing with an individualising identification marking.

SUMMARY OF THE INVENTION

To attain that object the invention proposes providing or using a transfer foil of the kind set forth in the opening part of this specification, which is distinguished in that provided on the same side of the carrier film in separate areas are on the one hand a decorative layer arrangement known per se from hot stamping foils and on the other hand a thermotransfer layer suitable for thermotransfer printing, and that the carrier film is a plastic film of a thickness of 3.5 to 19 $\mu$m.

The transfer foil according to the invention is thus distinguished in that for the first time a carrier film simultaneously carries transfer layers which are specifically suitable for different transfer procedures, namely on the one hand a decorative layer arrangement for the hot stamping procedure and on the other hand a thermotransfer layer for the thermotransfer printing procedure. The decorative layer arrangement on the one hand and the thermotransfer layer on the other hand are each provided in respectively separate areas, in which respect 'separate' does not have to mean that the various areas are respectively arranged at a spacing from each other. They are only to be clearly delimited from each other, but they can immediately adjoin each other. When using a transfer foil of that kind there is no need for the hot stamping decoration on the one hand and the thermotransfer printing on the other hand to be applied to the substrate, for example a value-bearing document, starting from separate transfer foils. On the contrary, the same transfer foil is used for both decoration and printing procedures, whereby the machine expenditure can be possibly considerably reduced in comparison with the use of two separate transfer foils. It is for example possible for the hot stamping operation on the one hand and the thermotransfer printing operation on the other hand to be effected substantially simultaneously with the transfer foil stationary if the stamping punch or die required for the hot stamping foil on the one hand and the print head required for the thermotransfer printing operation on the other hand are suitably arranged, for example in side-by-side relationship in the direction of transportation movement of the transfer foil.

Such an arrangement of hot stamping punches on the one hand and the thermal print head on the other hand is facilitated if, in the transfer foil, as is further provided in accordance with the invention, the decorative layer arrangement and the thermotransfer layer are arranged in strip form.

It is however also possible to provide for satisfactory alignment of the decorative layer arrangement with respect to the hot stamping punch and the thermotransfer layer with respect to the thermal print head respectively, by virtue of the provision on the carrier film of register marks, by means of which it is ensured that the transfer foil is moved into the correct respective position for transfer of the decorative layer arrangement and the thermotransfer layer.

Particularly good protection for the decorative layer arrangement which is transferred on to the substrate, on the one hand, and the identification marking produced by the thermotransfer printing operation, on the other hand, is achieved if, in accordance with the invention, a continuous transparent protective lacquer layer which can be transferred on to the substrate is provided between the carrier film and the decorative layer arrangement, and the thermotransfer layer. That protective lacquer layer protects the decorative layer arrangement and the thermotransfer layer from mechanical effects. Because the protective lacquer layer is continuous, forgery is also made more difficult because region-wise alterations in which in fact the protective lacquer layer must be ruined become visible, at least with suitable instruments, for example a magnifying glass.

Particularly for the use of given thermal print heads, it is desirable if, on its side remote from the decorative layer arrangement and the thermotransfer layer, the carrier film has an anti-friction layer which is known per se from thermotransfer foils.

A particular problem in regard to the production of transfer foils according to the invention involves the choice of the appropriate carrier film. In order to permit a neat and clean thermotransfer print, the carrier film may not be too thick and too stiff. On the other hand it must enjoy sufficient thermal stability and mechanical strength for it to be capable of being used as a carrier film of a hot stamping foil where in fact operation is effected with different temperatures and pressures from a thermotransfer printing procedure. In order to satisfy those requirements, it has been found advantageous in accordance with the invention to use a polyethyleneterephthalate film as the carrier film.

The carrier film is preferably from 5.5 to 12 $\mu$m in thickness.

As already mentioned the decorative layer arrangement used in accordance with the invention is an arrangement which is known from hot stamping foils and which desirably—starting from the carrier film—includes a protective lacquer layer, at least one lacquer layer involving a decorative configuration, and an adhesive layer. The use of a decorative layer arrangement which is usual per se in relation to hot stamping foils affords a large number of different possible design configurations for the transfer foil according to the invention. For example the decorative layer arrangement can include patterns, logos or the like which are defined by the use of different colours for the lacquer layer. In the same manner however the decorative layer arrangement may also have an optically effective structure in which case then the decorative layer arrangement should be at least region-wise metallised. Details in regard to the nature of the decorative layer arrangement however are not to be described herein because they are generally known from hot stamping foils, in particular also in the security sector.

BRIEF DESCRIPTION OF THE DRAWING

Further features, details and advantages of the transfer foil according to the invention will be apparent from the following description of a specific embodiment with reference to the drawing showing a view in section of a portion of a transfer foil. In that respect it should be pointed out that the thickness of the various layers is not shown true to scale because it is only the structure in principle of the transfer foil that is to be described.

DETAILED DESCRIPTION OF THE INVENTION

The transfer foil according to the specific embodiment includes a carrier film 1 which for example is a polyethyleneterephthalate film of a thickness of 3.5–19 $\mu$m, preferably a thickness of 5.7–12 $\mu$m.

On its one side that carrier film is provided with an anti-friction layer 2 which is intended to prevent the carrier film adhering to the print head or stamping punch.

In the illustrated embodiment, on the side opposite the anti-friction layer 2 the carrier film 1 is provided with a continuous transparent protective lacquer layer 3 which however can possibly be omitted. It would also be possible to provide between the protective lacquer layer 3 and the carrier film 1 a separation or detachment layer which is known from hot stamping foils but which can be omitted if the material used for the protective lacquer layer 3 is a lacquer which suitably easily comes loose from the carrier film 1.

In the illustrated embodiment, the protective lacquer layer 3 in turn carries three different elements, namely a decorative layer arrangement generally indicated at 4, a thermotransfer layer 5 and register marks 6.

As the drawing clearly shows the decorative layer arrangement 4 on the one hand and the thermotransfer layer 5 on the other hand are respectively arranged in separate areas of the surface of the carrier film 1, wherein in accordance with the illustrated embodiment there is a spacing between the areas having the decorative layer arrangement 4 on the one hand and the thermotransfer layer 5 on the other hand. In actual fact however the areas can also be arranged in such a way that they directly abut each other. It is even possible to provide a certain degree of overlap between the areas of the decorative layer arrangement 4 and the thermotransfer layer 5.

While the thermotransfer layer 5 usually includes only one layer portion and the register marks 6 are also formed only by one lacquer layer, the decorative layer arrangement 4 usually includes a plurality of layers, namely at least one lacquer layer which is of a decorative configuration and which in the illustrated embodiment comprises the lacquers 7*a* and 7*b* forming a given pattern, and an adhesive layer 8 which serves to fix the decorative layer arrangement 4 on the substrate.

The decorative layer arrangement 4 can be designed in a wide range of different ways in the manner known from hot stamping foils. For example the lacquer layers 7*a* and 7*b* may only be of different colours in order to produce decorative effects in that way. It is however also possible to provide lacquer layers 7*a* and 7*b* involving different degrees of transparency. In addition it would also be possible for example for the interface 9 between the lacquer layers 7*a* and 7*b* and the protective lacquer layer 3 to be provided with a spatial structure in order in that way to produce given optical effects, for example to achieve light diffraction etc. In that case the interface 9 would desirably have to be provided with a metallisation in order to cause the optical effects to be clearly apparent.

The combination according to the invention of a hot stamping foil decorative layer arrangement 4 with a thermotransfer layer 5 affords the possibility of individualisation. For example, decorative images, company logos or other security features in the form of a decorative layer arrangement can be applied to passes or identity cards, labels, value-bearing papers or security bonds etc, which are then each individually provided with an individualising identification marking by means of the thermotransfer layer. In that respect, when using the transfer foil according to the invention, the procedure involves generally successively applying on the one hand the decorative layer arrangement 4 in a hot stamping unit and on the other hand the individualising identification marking by means of the thermotransfer layer 5 in a thermal printer unit. In that procedure, the decorative layer arrangement 4 can be transferred on to the substrate in the hot stamping process either as a whole but also only in a region-wise manner, in which respect the procedure is desirably such that the decorative layer arrangement 4 is already of a suitable graphic configuration in itself so that it can be transferred as a whole. Accurate alignment of the decorative layer arrangement 4 on the one hand and the thermotransfer layer 5 serving to produce the individualising identification marking on the other hand is effected by means of the register marks 6 which are usually not also transferred on to the substrate.

The most widely varying materials can be used as the substrates, for example plastic cards of PVC, PC, PET etc. Plastic or paper labels or value-bearing papers or security bonds can also be correspondingly decorated.

Set out hereinafter are examples of the compositions or formulations for the individual layers disposed on the carrier film 1:

| | |
|---|---|
| Anti-friction layer 2: thickness 0.1–1.0 μm | |
| Methylethylketone | 800 |
| Cyclohexanone | 120 |
| Cellulose acetopropionate (mp: 210° C.) | 65 |
| Polyvinylidene fluoride (d = 1.7 g/cm$^3$) | 15 |
| Protective lacquer layer 3: thickness 0.4–2.0 μm | |
| Methylethylketone | 300 |
| Ethylacetate | 300 |
| Cyclohexanone | 100 |
| Acrylate copolymer (mp: 180° C.) | 120 |
| Colophony resin (mp: 160° C.) | 100 |
| Silicone-modified polyester ($d_{25°}$ = 1.25) | 5 |
| Polyethylene wax (softening point: 140° C., 20% dispersed in xylene) | 75 |
| Thermotransfer layer 5: thickness 1.0–4.0 μm | |
| Methylethylketone | 200 |
| Toluene | 150 |
| Butylacetate | 100 |
| Ethylenevinylacetate copolymer (mp: 100° C.) | 80 |
| Maleinate resin (mp: 95° C.) | 120 |
| Ketone resin (mp: 110° C.) | 120 |
| Dispersing additive (high-molecular copolymer, 40%; amine number: 20) | 20 |
| $SiO_2$ | 10 |
| Pigment(s) (inorganic and/or organic) (Carbon black or iron oxide pigments can be used as inorganic pigments and monoazo pigments or phthalocyanine pigments can be used as organic pigments) | 200 |

-continued

| | |
|---|---|
| Decorative lacquer 7a, 7b: thickness 1.0–10.0 μm | |
| Methylethylketone | 300 |
| Ethylacetate | 100 |
| Butylacetate | 50 |
| Cyclohexanone | 80 |
| Polymethylmethacrylate (Tg = 50° C.) | 70 |
| Vinylchloride/vinylacetate copolymer (softening point 115° C., acid number: 10–15) | 70 |
| Polyester resin (softening point 103° C.) | 60 |
| Dispersing additive (high-molecular copolymer, 40%; amine number: 20) | 30 |
| $SiO_2$ | 10 |
| Pigment(s) (inorganic and/or organic) (Examples of inorganic pigments which can be used in this connection are titanium dioxide and iron oxide pigments. Organic pigments which can be used are phthalocyanine, quinacridone and azo pigments) | 230 |
| Adhesive layer 8: thickness 0.5–3.0 μm | |
| Methylethylketone | 500 |
| Toluene | 280 |
| Vinylchloride terpolymer (Tg = 89° C.) | 120 |
| Butylmethacrylate/methylmethacrylate copolymer (Tg = 65° C.) | 70 |
| $SiO_2$ | 30 |

I claim:

1. A transfer foil, which comprises:

a carrier film formed of a plastic film of a thickness of from 3.5 to 19 μm;

at least one decorative layer provided region-wise on a side of said carrier film, said decorative layer being transferable by a hot stamping process utilizing heat and pressure; and a thermotransfer layer provided region-wise on said side of the carrier film and separate from said decorative layer, said thermotransfer layer being transferable by a thermal print head.

2. The transfer foil as defined in claim 1 and further including register marks provided on said carrier film.

3. The transfer foil as defined in claim 1 or 2 wherein said at least one decorative layer and said thermotransfer layer are arranged in strips.

4. The transfer foil as defined in claim 1 or 2 wherein a continuous transparent protective lacquer layer transferable to a substrate is provided on said side of said carrier film between said carrier film and said at least one decorative layer and thermotransfer layer.

5. The transfer foil as defined in claim 1 wherein an anti-friction layer is provided on said carrier film on a side opposite said side of said carrier film having said at least one decorative layer and said thermotransfer layer.

6. The transfer foil as defined in claim 1 wherein said carrier film is formed of polyethyleneterephthalate.

7. The transfer foil as defined in claim 1 wherein said carrier film is of a thickness of from 5.5 to 12 μm.

8. The transfer foil as defined in claim 1 wherein said at least one decorative layer, starting from said carrier film, includes a protective lacquer layer, at least one lacquer layer of a decorative configuration and an adhesive layer.

* * * * *